W. R. Axe,
Paint Mill.
No. 92,561. Patented July 13, 1869
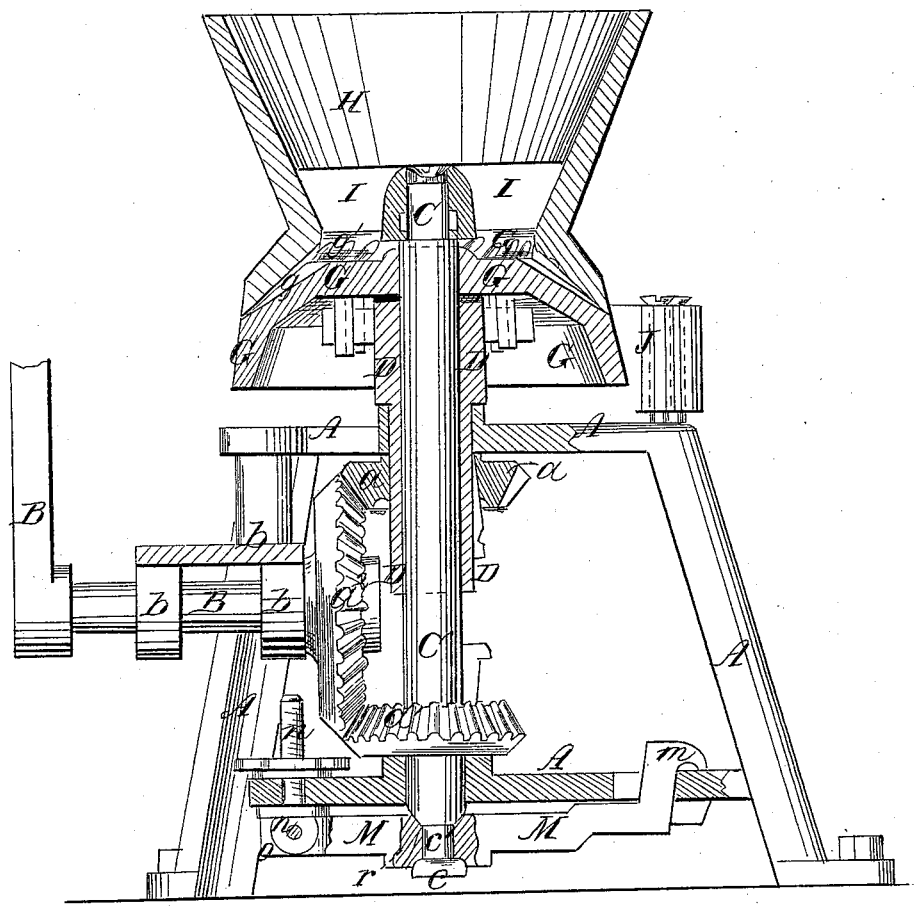
Witnesses. Inventor:

United States Patent Office.

WILLIAM R. AXE, OF ROCKTON, ILLINOIS, ASSIGNOR TO SAMUEL J. GOODWIN, OF BELOIT, WISCONSIN.

Letters Patent No. 92,561, dated July 13, 1869.

IMPROVEMENT IN PAINT-MILLS.

The Schedule referred to in these Letters Patent and making part of the same.

*To all whom it may concern:*

Be it known that I, WILLIAM R. AXE, of Rockton, in the county of Winnebago, and State of Illinois, have invented a new and useful Improvement in Paint-Mills; and I do hereby declare that the following is a full, clear, and exact description of the construction and operation of the same, reference being had to the accompanying drawings, making a part of this specification, in which my invention is represented by a vertical section.

This invention, which is an improvement upon the device patented by Samuel J. Goodwin, April 2, 1867, No. 63,502, consists in combining, with said Goodwin's invention, a lower grinding-disk, revolving in a direction opposite to that of the hopper, and an adjustable and detachable spindle-step of peculiar construction, all arranged and operating in connection with the frame and motive-apparatus, as will now be more particularly described.

In the drawings—

A represents the stand or supporting-frame, cast in a single piece.

B, the driving-shaft and crank.

$b\ b$, the bearings of the driving-shaft.

G, the lower or grinding-disk, having "screw"-furrows cut around its upper face, near the outer edges thereof.

H, the hopper, above the disk G, and supported upon a shaft, C; said hopper having an inclined or "flaring" flange, $h$, around its lower edge, fitting the shape of the grinding-disk, and, if preferred, having also screw-furrows on the under side of said flange.

D, the sleeve-shaft, which supports the grinding-disk.

$a$, the mitre-wheel, attached to the lower end of shaft D;

$a^1$, a similar wheel attached to shaft C; and $a^2$, a bevel-gear wheel, on the end of shaft B, between the wheels $a\ a^1$, and driving both of them.

By putting the crank B in motion, the disk G is caused to revolve in one direction, and the hopper H in another, whereby the paint is ground and forced out between said hopper and lower disk twice as rapidly as in the old machine.

The upper end of shaft C fits into a cross-bar, I, cast with the hopper, and forming a part of it.

The shaft is so fastened to the cross-bar that the latter, with the hopper, is made to revolve with the shaft.

The cross-bar not only forms the means of supporting and rotating the hopper, but acts also as an agitator, to cause the paint to feed uniformly and rapidly to the screw or grinding-surface $g\ g'$.

J is a spring-scraper, acting against the outside surface of the disk G, below the hopper, for the purpose of scraping therefrom the pulverized paint that is forced through between the disk and hopper.

M is a movable step for the shaft C. It is fastened at one end to a slotted cross-bar or frame, A, by means of a hook, $m$, and at the other end by means of a screw-bolt, $n$, and open slot $o$.

The lower end of shaft C steps in a gain or open slot, $r$, in the side of this step, the shaft being provided with a head, $c$, connected to it by a small neck, $c'$, so that it will run smoothly and uniformly in its bearing.

Having thus described my invention, I will state that I do not claim the combination of two grooved grinding-disks, revolving in opposite directions, and operated by wheels $a\ a^1\ a^2$; neither do I claim a lever-spindle step, adjustable by means of a screw; neither do I claim the arrangement of both said devices in one machine, for I am aware that all these parts have been constructed and used.

What I do claim, and desire to secure by Letters Patent is as follows, viz:

In a grinding-machine, having the hopper H, with corrugated base-flange $h$, and cross-bar I, I claim the described construction and arrangement of the concavo-convex lower disk G, having the grooved surface $g$, the shaft $c$ fixed to the cross-bar I, and rotating the hopper, the hollow shaft D fixed to and rotating the disk G, the motive-apparatus $a\ a^1\ a^2$ B, the detachable step M, held at one end by the hook $m$, adjustable at the other by the screw $n$, and supporting, in an open socket, $r$, at or near its centre, the shaft C, which is cut away to fit the socket, together with the supporting-frame A $b$, all combined and adapted to operate in connection with each other substantially as and for the purposes set forth.

To the above specification of my improvement, I have set my hand, this 29th day of March, 1869.

WILLIAM R. AXE.

Witnesses:
N. A. CARPENTER,
STEPHEN O. TRIPP.